US008165700B2

(12) United States Patent
Pettus et al.

(10) Patent No.: US 8,165,700 B2
(45) Date of Patent: Apr. 24, 2012

(54) COMPLETE INTEGRATION OF STAND-ALONE BATCH OPERATOR INTERFACE CAPABILITIES INTO GENERIC HUMAN MACHINE INTERFACE USING COMPONENTIZED OBJECTS

(75) Inventors: Nathan William Pettus, Georgetown, TX (US); Tusar Nanda, Austin, TX (US); Aaron C. Jones, Round Rock, TX (US); William George Irwin, Austin, TX (US); James Henry Moore, Jr., Georgetown, TX (US); David L. Deitz, Austin, TX (US); Danny H. Do, Pflugerville, TX (US); Dawn Marruchella, Austin, TX (US)

(73) Assignee: Fisher-Rosemount Systems, Inc., Round Rock, TX (US)

( * ) Notice: Subject to any disclaimer, the term of this patent is extended or adjusted under 35 U.S.C. 154(b) by 393 days.

(21) Appl. No.: 12/244,134

(22) Filed: Oct. 2, 2008

(65) Prior Publication Data
US 2010/0087935 A1 Apr. 8, 2010

(51) Int. Cl.
G05B 19/42 (2006.01)
G06F 3/00 (2006.01)
G06F 9/46 (2006.01)
G06N 5/02 (2006.01)

(52) U.S. Cl. ............. 700/86; 715/700; 706/49; 718/101
(58) Field of Classification Search .................... 700/29, 700/31, 86; 718/101; 706/49; 719/315
See application file for complete search history.

(56) References Cited

U.S. PATENT DOCUMENTS 5,101,362 A * 3/1992 Simoudis ................. 706/49
5,260,883 A 11/1993 Wilson
5,506,999 A * 4/1996 Skillman et al. ........... 718/105

(Continued)

FOREIGN PATENT DOCUMENTS
WO WO-2009/023659 A1 2/2009

OTHER PUBLICATIONS

Craig et al., "Batch Control Part 1: Models and Terminology (ANSI/ISA-88.01-1995)," ISA The Instrumentation, Systems and Automation Society (1995). Available at URL:http://www.isa.org/Content/Microsites165/SP18,_Instument_Signals_and_Alarms/Home163/ISA_Standards_for_Committee_Use/S_8801.pdf.

(Continued)

Primary Examiner — Kakali Chaki
Assistant Examiner — Sivalingam Sivanesan

(57) ABSTRACT

Systems and methods for providing an integrated HMI application for monitoring and interacting with both batch and non-batch processes in a process plant are disclosed. A plurality of independent stand-alone software objects defining various batch process interface views are embedded within a non-batch process control interface application. A blackboard service is provided for storing batch control data used by the various stand alone software objects. The blackboard service may be adapted to communicate with a batch control server to receive batch control data for populating the various batch interface views with data relating to various batch processes being carried out in the process plant and to send instructions for controlling the various batches input by users via the various batch interface views. When executed by a processor, the stand alone software objects defining the various batch interface views read data from and write data to the blackboard service to communicate data between batch process interface views and preserve contextual information between interface views to allow efficient and intuitive navigation between batch process interface views.

21 Claims, 10 Drawing Sheets

U.S. PATENT DOCUMENTS

| | | | |
|---|---|---|---|
| 5,812,840 A | 9/1998 | Shwartz | |
| 6,618,630 B1 * | 9/2003 | Jundt et al. | 700/17 |
| 7,020,876 B1 | 3/2006 | Deitz et al. | |
| 7,249,356 B1 * | 7/2007 | Wilson et al. | 718/101 |
| 2006/0259634 A1 | 11/2006 | Hood et al. | |
| 2008/0066019 A1 * | 3/2008 | Worek et al. | 715/965 |
| 2009/0149981 A1 * | 6/2009 | Evans et al. | 700/110 |

OTHER PUBLICATIONS

European Search Report for Application No. EP09172004, dated Jan. 12, 2010.

Search Report under Section 17 for Application No. GB0914868.5, dated Dec. 16, 2009.

* cited by examiner

FIG. 13

| Time | Batch_ID | Recipe | Description | Event Type | Value | Eng. Units | Area | Process Cell | Unit |
|---|---|---|---|---|---|---|---|---|---|
| 3/7/2008 10:05:09AM | Batch_1 | OP_NO_PROMPT | | Event File Name | D:\DeltaV\code\DVData\batch\journals@USAUST-DEV179_2 | | | | |
| 3/7/2008 10:05:09AM | Batch_1 | OP_NO_PROMPT | OP_NO_PROMPT | Equipment Selection | UCLS_179_6 | | | | |
| 3/7/2008 10:05:09AM | Batch_1 | OP_NO_PROMPT | Formula Name | Formula Header | <DEFAULTS> | | | | |
| 3/7/2008 10:05:09AM | Batch_1 | OP_NO_PROMPT | Version | Recipe Header | 1 | | | | |
| 3/7/2008 10:05:09AM | Batch_1 | OP_NO_PROMPT | Version Date | Recipe Header | 11:51:11 September 19, 2007 | | | | |
| 3/7/2008 10:05:09AM | Batch_1 | OP_NO_PROMPT | Author | Recipe Header | ADMINISTRATOR | | | | |
| 3/7/2008 10:05:09AM | Batch_1 | OP_NO_PROMPT | Product Code | Recipe Header | UNDEFINED | | | | |
| 3/7/2008 10:05:09AM | Batch_1 | OP_NO_PROMPT | Description | Recipe Header | UNDEFINED | | | | |
| 3/7/2008 10:05:09AM | Batch_1 | OP_NO_PROMPT | Class or Instance | Recipe Header | Class | | | | |
| 3/7/2008 10:05:09AM | Batch_1 | OP_NO_PROMPT | Recipe Type | Recipe Header | UO | | | | |
| 3/7/2008 10:05:09AM | Batch_1 | OP_NO_PROMPT | Area Model File Name | Recipe Header | D:\DeltaV\code\DVData\DOWNLOAD\AREAMODEL.SCR | | | | |
| 3/7/2008 10:05:09AM | Batch_1 | OP_NO_PROMPT | File Name | Recipe Header | D:\DeltaV\code\DVData\DOWNLOAD\OP_NO_PROMPT.UOP | | | | |
| 3/7/2008 10:05:09AM | Batch_1 | OP_NO_PROMPT | Scale | Recipe Header | 100 | % | | | |
| 3/7/2008 10:05:09AM | Batch_1 | OP_NO_PROMPT | | System Message | DeltaV Batch Executive Version v10.2 Build 5488 | Operation | AREA_DEV179 | PCELL1 | UCLS |
| 3/7/2008 10:05:09AM | Batch_1 | OP_NO_PROMPT | | System Message | Beginning Of BATCH | Operation | AREA_DEV179 | PCELL1 | UCLS |
| 3/7/2008 10:05:09AM | Batch_1 | OP_NO_PROMPT | State Changed: | State Change | CREATED | | AREA_DEV179 | PCELL1 | UCLS |
| 3/7/2008 10:05:09AM | Batch_1 | OP_NO_PROMPT | Step Activated | Step Activity | Initial Step | | AREA_DEV179 | PCELL1 | UCLS |
| 3/7/2008 10:05:09AM | Batch_1 | OP_NO_PROMPT | Operation Started | System Message | | | AREA_DEV179 | PCELL1 | UCLS |
| 3/7/2008 10:05:09AM | Batch_1 | OP_NO_PROMPT | State Commanded: | State Command | START | | AREA_DEV179 | PCELL1 | UCLS |
| 3/7/2008 10:05:09AM | Batch_1 | OP_NO_PROMPT | State Change | State Change | RUNNING | | AREA_DEV179 | PCELL1 | UCLS |
| 3/7/2008 10:05:09AM | Batch_1 | OP_NO_PROMPT | Step Activated | Step Activity | PCLS_NO_PROMPT:1-1 | Phase | AREA_DEV179 | PCELL1 | UCLS |
| 3/7/2008 10:05:09AM | Batch_1 | OP_NO_PROMPT | State Change | State Change | IDLE | | AREA_DEV179 | PCELL1 | UCLS |
| 3/7/2008 10:05:09AM | Batch_1 | OP_NO_PROMPTP | Owner Changed Detected: Owner Change | | DELTAV BATCH | | AREA_DEV179 | PCELL1 | UCLS |
| 3/7/2008 10:05:09AM | Batch_1 | OP_NO_PROMPTP | Resource Acquired by reci Recipe Arbitration | | UCLS_179_6 | Unit | AREA_DEV179 | PCELL1 | UCLS |
| 3/7/2008 10:05:09AM | Batch_1 | OP_NO_PROMPT | Step Deactivated | Step Activity | Initial Step | | AREA_DEV179 | PCELL1 | UCLS |
| 3/7/2008 10:05:09AM | Batch_1 | OP_NO_PROMPTP | Resource Acquired by reci Recipe Arbitration | | UCLS_179_6/PCLS_NO_PROMPT | Phase | AREA_DEV179 | PCELL1 | UCLS |
| 3/7/2008 10:05:09AM | Batch_1 | OP_NO_PROMPT | PARAM_INPUT_1 | Recipe Value | 0 | | AREA_DEV179 | PCELL1 | UCLS |
| 3/7/2008 10:05:09AM | Batch_1 | OP_NO_PROMPT | PARAM1 | Recipe Value | 0 | | AREA_DEV179 | PCELL1 | UCLS |
| 3/7/2008 10:05:09AM | Batch_1 | OP_NO_PROMPTP | NEW_INPUT | Recipe Value | 0 | | AREA_DEV179 | PCELL1 | UCLS |
| 3/7/2008 10:05:09AM | Batch_1 | OP_NO_PROMPTP | R_HANG | Recipe Value | 345 | | AREA_DEV179 | PCELL1 | UCLS |
| 3/7/2008 10:05:09AM | Batch_1 | OP_NO_PROMPTP | State Changed: | State Change | RUNNING | | AREA_DEV179 | PCELL1 | UCLS |
| 3/7/2008 10:05:09AM | Batch_1 | OP_NO_PROMPTP | PARAM_INPUT_1 | Param Download V | 0 | | AREA_DEV179 | PCELL1 | UCLS |
| 3/7/2008 10:05:09AM | Batch_1 | OP_NO_PROMPTP | PARAM1 | Param Download V | 0 | | AREA_DEV179 | PCELL1 | UCLS |
| 3/7/2008 10:05:09AM | Batch_1 | OP_NO_PROMPT | NEW_INPUT | Param Download V | 0 | | AREA_DEV179 | PCELL1 | UCLS |
| 3/7/2008 10:05:09AM | Batch_1 | OP_NO_PROMPT | R_HANG | Param Download V | 345 | | AREA_DEV179 | PCELL1 | UCLS |
| 3/7/2008 10:05:09AM | Batch_1 | OP_NO_PROMPT | NEW_REPORT | REPORT | 0 | | AREA_DEV179 | PCELL1 | UCLS |
| 3/7/2008 10:05:09AM | Batch_1 | OP_NO_PROMPTP | PARAM_REPORT1 | REPORT | 0 | | AREA_DEV179 | PCELL1 | UCLS |
| 3/7/2008 10:05:09AM | Batch_1 | OP_NO_PROMPTP | PARAM2 | REPORT | 0 | | AREA_DEV179 | PCELL1 | UCLS |
| 3/7/2008 10:05:09AM | Batch_1 | OP_NO_PROMPTP | NEW_REPORT | REPORT | 0 | | AREA_DEV179 | PCELL1 | UCLS |
| 3/7/2008 10:05:09AM | Batch_1 | OP_NO_PROMPTP | THISISTHENEWREPO | REPORT | | | AREA_DEV179 | PCELL1 | UCLS |

COMPLETE INTEGRATION OF STAND-ALONE BATCH OPERATOR INTERFACE CAPABILITIES INTO GENERIC HUMAN MACHINE INTERFACE USING COMPONENTIZED OBJECTS

FIELD OF DISCLOSURE

The present disclosure relates to human-machine interfaces (HMI) for controlling processes in a process plant environment. More specifically, systems and methods are disclosed for integrating batch process control interface views and non-batch interface control views into a single human-machine interface application.

BACKGROUND

Within an industrial processing plant there are generally two types of processes to be controlled, batch processes and continuous or non-batch processes. In most cases there are two separate interfaces for allowing plant operators, engineers and other personnel to interact with the two different types of processes, a batch HMI for monitoring and interacting with batch processes and a continuous or non-batch HMI for monitoring and interacting with non-batch processes. The batch interface typically includes interface views specific to batch operations such as a list of active batches, a batch history or event logs, batch alarms, a summary of active phases, and so forth. The continuous or non-batch HMI includes continuous process interface views such as non-batch alarms, PID faceplates, equipment graphics showing flow and other key variables, and so forth. Over the years the two types of interfaces, batch HMIs and non-batch HMIs, have evolved separately and have generally been kept separate. The two types of interfaces serve different needs, and until recently there has been no strong reason for merging them.

More recently, however, batch processing environments have become more complex and more common. Today's batch processing plants are often capable of running multiple different product recipes at the same time. Also, the same equipment can be devoted to different product recipes at different times. Thus, the batch control system must be capable of managing multiple parallel batches and interacting with many different parts of the process plant at the same time. The increasing size and complexity of today's batch processes and the increased need for flexibility within the processing plant have required tighter integration between batch and non-batch operations within the processing plant. This has put a strain on both batch process control systems and non-batch process control systems alike.

One area where the strain of integrating batch and non-batch operations has manifested itself is in the area of operator interfaces. With the tighter integration of batch and non-batch operations, operators, engineers and other plant personnel are often required to monitor and interact with both batch and non-batch processes at the same time. Since batch and non-batch HMIs are typically separate, this requires moving back and forth between batch and non-batch HMI applications. If the two applications are executed on separate workstations this may require physically moving from one machine to another to switch from batch views to non-batch views or from non-batch views to batch views of the various processes controlled within a processing plant. Even if the two applications are executed on the same machine, an operator or other personnel must launch both HMIs and toggle between applications to view and interact with one type of data or the other.

To solve this issue, an integrated HMI application is required that combines the functionality of a batch HMI and a non-batch HMI. Such an integrated HMI must provide all of the functionality of both a standalone batch control HMI and a standalone non-batch control HMI. Furthermore, such an integrated HMI application must present data to and receive input from a user in an efficient and easily understood manner without taxing the resources of the overall processing plant control system.

SUMMARY

Systems and methods for providing an integrated HMI application for monitoring and interacting with both batch and non-batch processes in a process plant are disclosed. A plurality of independent stand-alone software objects defining various batch process interface views are embedded within a non-batch process control interface application. A blackboard service is provided for storing batch control data used by the various stand alone software objects. The blackboard service may be adapted to communicate with a batch control server to receive batch control data for populating the various batch interface views with data relating to various batch processes being carried out in the process plant and to send instructions input by users for controlling the various batches via the various batch process interface views. When executed by a processor, the stand alone software objects defining the various batch process interface views are adapted to read data from and write data to the blackboard service to communicate data between batch process interface views and preserve contextual information between interface views to allow efficient and intuitive navigation between batch process interface views.

According to an embodiment, an integrated process control interface for displaying batch control and non-batch control process data and receiving user input for controlling batch and non-batch processes within a process plant is provided. The integrated process control interface includes a display device, an input device for receiving user input, a processor adapted to execute program instructions, and a computer memory. Program instructions are stored in the computer memory. The program instructions define a non-batch process control interface application which, when executed by the processor, causes non-batch process control views to be displayed on the display device and allows user input to be received from the input device for controlling non-batch processes in the process plant. The program instructions also include a plurality of self-contained software objects that are embedded within the non-batch process control interface application. When the self-contained software objects are executed by the processor they cause batch process interface views to be displayed on the display device and allow user input to be received from the input device for controlling batch processes within the process plant. Finally, program instructions defining a blackboard service are stored in the computer memory. When executed by the processor, the blackboard service allows data written from the self-contained software objects to be stored in the computer memory and allows data stored in the computer memory to be written to the self-contained software objects. Thus, a second self-contained software object, when executed by the processor, may display a batch process control view based at least in part on data from a first self-contained software object.

Another embodiment of an integrated process control interface system for displaying both batch process control data and non-batch process control data and for receiving user input for controlling both batch processes and non-batch processes within a process plant includes a batch process data server and a non-batch process data server. One or more workstations are communicatively coupled to the batch process control data server and the non-batch process control data server. The batch process control-data server and the non-batch process control data server provide batch and non-batch process data to the one or more workstations. Similarly, the one or more workstations provide batch and non-batch process control data representing user input for controlling the batch and non-batch processes operating within the process plant to the batch process control server and the non-batch process control server. At least one of the one or more workstations implements a non-batch process control interface application for displaying a plurality of non-batch process interface views for presenting non-batch process control data to a user and receiving user input for controlling non-batch processes within the process plant. The non-batch process control interface application includes a plurality of embedded self-contained software objects which, when executed by the workstation, generate batch process interface views for presenting batch process control data to a user and for receiving user input for controlling batch processes within the process plant. At least one of the one or more workstations also implements a blackboard service accessible by the embedded software objects whereby the embedded software objects may write data to and read data from the blackboard service so that batch process control data from one embedded software object may be used by another embedded software object.

A method of displaying batch process control interface views via a non-batch process control interface application is also disclosed. The method calls for embedding a plurality of self-contained software objects within the non-batch process control interface application. The self-contained software objects are adapted to generate batch process interface views for display on an interface display device. The method further calls for executing a first self-contained software object to display a first batch process control interface view, writing context data to a blackboard service representing a displayed state of the first batch process control interface view, and executing a second self-contained software object embedded in the non-batch process control interface application, reading the context data written to the blackboard service, and displaying a second batch process control interface view generated by the second self-contained software object reflecting the displayed state of the first batch process control interface view when the first self-contained software object was closed.

Yet another embodiment of a process control system calls for a batch process control data server, a non-batch process control data server, and an integrated human-machine interface (HMI) communicatively connected to the batch and non-batch process control data servers. The integrated HMI is adapted to display both batch and non-batch process control interface views that include process data received from the batch and non-batch process control data servers, respectively. A blackboard service is associated with the integrated HMI. The blackboard service allows independent batch process control interface views to exchange data, including contextual data, whereby a subsequently opened batch process control interface view may be opened to display batch process control data consistent with a display context associated with one or more previously opened batch process control interface views.

Finally, a computer readable medium is provided. Programming instructions are stored on the computer readable medium. When the programming instruction are executed by a computer they provide a non-batch process control interface application having a plurality of self-contained batch process control interface views embedded therein. The programming instruction further provide a blackboard service from which and to which the self-contained batch process control interface views embedded in the non-batch process control interface application may read and write contextual data relating to interface actions taken with respect to the self-contained batch process control interface views. When executed by a computer, the program instructions further instruct the computer to display a batch process control interface view wherein data displayed in the batch process control interface view is determined based at least partially on contextual data written to the blackboard service by a batch process control interface view.

Further aspects and advantages will be apparent to those of ordinary skill in the art from a review of the following detailed description, taken in conjunction with the drawings. While the systems and methods are susceptible of embodiments in various forms, the description hereafter includes specific embodiments with the understanding that the disclosure is illustrative, and is not intended to limit the invention to the specific embodiments described herein.

BRIEF DESCRIPTION OF THE DRAWINGS

FIG. 13 is a display screen shot of a Batch Event batch interface view.

DETAILED DESCRIPTION

The present disclosure relates to a human-machine interface system (HMI) for use in an industrial process plant environment. Specifically, an integrated HMI system is disclosed which allows batch process data and non-batch process data to be viewed via a single non-batch process interface application.

Figure 1:
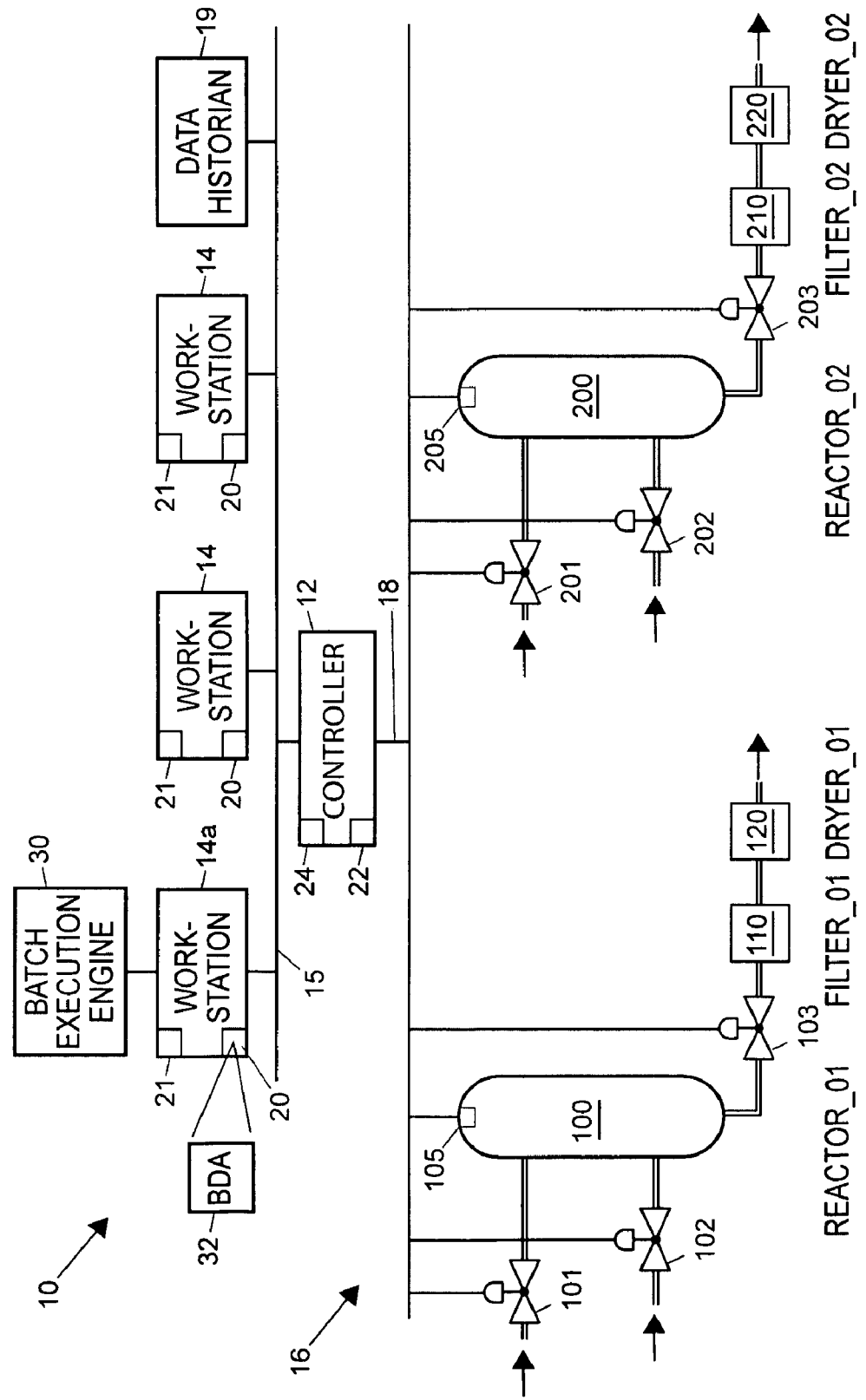
FIG. 1 is a block diagram showing an exemplary portion of a process plant control network.

FIG. 1 shows an exemplary portion of a typical process plant control network 10. The process plant control network 10 includes a controller 12 which is coupled to numerous devices and equipment within the process plant via one or more input/output (I/O) devices (not shown) and a set of communication lines and/or a bus 18. The various devices and equipment connected to the controller 12 are generally designated by reference numeral 16. The controller 12 may be, for example, the DeltaV™ batch controller sold by Emerson Process Management. The controller 12 communicates with various process control elements such as field devices and function blocks within field devices located throughout the process plant to perform one or more process control routines to control various processes performed within the plant. The process control routines may include both continuous process control routines and batch process control routines.

The process controller 12 may also be coupled to one or more workstations 14, via for example, a local area network (LAN) 15 such as an ethernet network or the like. The workstations 14 may be personal computers, servers, or other data processing devices. The workstations 14 may be used by processing plant engineers, operators, or other personnel to design and execute one or more programmed control routines to be executed by the controller 12, to communicate with the controller to implement such process control routines, to receive and display information pertaining to the operation of the process plant, and otherwise interact with the process control routines executed by the controller (and/or other process controllers or control devices). A data historian 19 may also be connected to the LAN 15. The data historian 19 may automatically collect data generated within the process plant including within the controller 12, the field devices and other equipment 16, and perhaps the workstations 14 themselves. The workstations 14 may access data stored in the data historian 19 and elsewhere to populate interface display pages with data relating to the operation of the process plant.

Each of the workstations 14 includes a memory 20 for storing applications, such as HMI applications, and for storing data, such as continuous process variable data and batch process data pertaining to the operation of the process plant. Each of the workstations 14 also includes a processor 21 that executes one or more applications which may, among other things, enable a user to view non-batch or continuous process data, as well as batch process data relating to the operation of the process plant. The controller 12 includes a memory 22 for storing configuration data and process control routines to be used to control the equipment 16 within the process plant, and a processor 24 that executes the process control routines to implement a process control strategy. The workstations 14, in conjunction with the controller 12, may provide a graphical depiction of the process control routines within the controller 12 to a user illustrating the control elements within the process control routine and the manner in which these control elements are configured to provide control of the processes performed within the process plant 16.

In the example process plant control network 10 illustrated in FIG. 1, the controller 12 is communicatively connected via the bus 18 to two sets of similarly configured equipment, each set of equipment having a reactor unit referred to herein as Reactor_01 (R1) or Reactor_02 (R2), a filter unit referred to herein as Filter_01 (F1) or Filter_02 (F2) and a dryer unit referred to herein as Dryer_01 (D1) or Dryer_02 (D2). Reactor_01 includes a reactor vessel 100, two input valves 101 and 102 connected so as to control fluid inlet lines providing fluid from, for example, a headtank (not shown) into the reactor vessel 100 and an output valve 103 connected so as to control fluid flow out of the reactor vessel 100 via an outlet fluid line. A device 105, which can be a sensor, such as a temperature sensor, a pressure sensor, a fluid level meter etc. or some other equipment such as an electrical heater or a steam heater, is disposed in or near the reactor vessel 100. The Reactor_01 is coupled via the valve 103 to the Filter_01 having filter equipment 110 which, in turn is coupled to the Dryer_01 having dryer equipment 120. Similarly, the second set of equipment includes the Reactor_02 which has a reactor vessel 200, two input valves 201 and 202, an output valve 203 and a device 205. The Reactor_02 is coupled to the Filter_02 having filter equipment 210 which, in turn, is coupled to the Dryer_02 which has dryer equipment 220. The filter equipment 110 and 210 and the dryer equipment 120 and 220 may have additional control elements (such as heaters, conveyor belts and the like), sensors, etc. associated therewith. If desired, although not shown, each of the filter units Filter_01 and Filter_02 may be physically coupled to each of the reactor units Reactor_01 and Reactor_02 while each of the dryer units Dryer_01 and Dryer_02 may be coupled to each of the filter units Filter_01 and Filter_02 so that a batch run using one of each of a reactor, a filter and a dryer may use any combination of the equipment 16 illustrated in FIG. 1.

As illustrated in FIG. 1, the controller 12 is communicatively coupled to the valves 101-103, 201-203, to the devices 105, 205, to the filters 110, 210 and to the dryers 120 and 220 (and to the other equipment associated therewith) via the bus 18 to control the operation of these elements (which may be units, field devices, etc.) to perform one or more operations with respect to these elements. Such operations may include, for example, filling the reactor vessels, or dryers, heating the material within the reactor vessels or dryers, dumping the reactor vessels or dryers, cleaning the reactor vessels or dryers, operating the filters, etc. Of course, the controller 12 could be coupled to the elements 16 within the process plant via additional busses, via dedicated communication lines, such as 4-20 mA lines, HART communication lines, etc.

The valves, sensors and other equipment illustrated in FIG. 1 may be any desired kind or type of equipment including, for example, Fieldbus field devices, standard 4-20 mA field devices, HART field devices, etc., and may communicate with the controller 12 using any known or desired communication protocol such as the Fieldbus protocol, the HART protocol, the 4-20 mA analog protocol, etc. Still further, other types of devices may be connected to and be controlled by the controller 12 in any desired manner. Also, other controllers may be connected to the controller 12 and to the workstations 14 via, for example, the Ethernet communication line 15 to control other devices or areas associated with the process plant 16 and the operation of such additional controllers may be coordinated with the operation of the controller 12 illustrated in FIG. 1 in any desired or known manner.

Generally speaking, the process control system of FIG. 1 may be used to implement batch processes in which, for example, one of the workstations 14 executes a batch execution application that implements and possibly coordinates different batch runs within the process plant. Such a batch execution engine 30 is illustrated as being stored in the workstation 14a of FIG. 1, it being understood that the batch execution engine 30 could be stored in and executed in other workstations 14, or in other computers communicatively connected to the bus 15 or to the bus 18 in any desired manner, including in any wireless manner. Likewise, if desired, the batch execution engine 30 may be divided into various components or be associated with various components stored in and executed in different computers or workstations within the process plant 16.

The batch execution engine 30 is generally a high level control routine and may include what is commonly referred to as a batch campaign manager that enables a user to specify a number of batch runs to be performed within the process plant and that sets up a number of different batch runs or batch processes to operate essentially independently within the process plant control network 10. The batch execution engine 30 may also include batch executive routines or applications that implement and oversee the different batch runs specified by the campaign manager. Each such batch run directs the operation of one or more procedures, unit procedures, operations, phases and other sub-divisions of a batch, each of which are or may be sub-routines or processes that operate on a single unit, such as one of the reactor units, the filter units, the dryer units, or other equipment within the process plant. In this example, each unit procedure (which is a part of a batch run that is generally run on one of the workstations 14) may perform a series of operations, each of which may perform one or more phases on a physical unit. For this discussion, a phase is the lowest level action or step performed on a unit and is typically implemented or executed in one of the controllers 12, an operation is a set of phases that performs a particular function on the unit and is typically implemented or executed on one of the workstations 14 by calling a series of phases within the controller 12, and a unit procedure is a series of one or more operations performed on a single unit and is typically implemented as a set of operation calls on one of the workstations 14. Likewise, a procedure is a set of unit procedures which may be performed on, for example, different physical units within the process plant 16. As a result, any procedure can include one or more unit procedures, and any unit procedure can include one or more phases and/or one or more operations. In this manner, each batch process performs different steps or stages (e.g., unit procedures) needed to produce a product, such as a food product, a drug, etc.

To implement different procedures, unit procedures, operations and phases for an individual batch, a batch process uses what is commonly referred to as a recipe which specifies the steps to be performed, the amounts and times associated with the steps and the order of the steps. Steps for one recipe might include, for example, filling a reactor vessel with the appropriate materials or ingredients, mixing the materials within the reactor vessel, heating the materials within the reactor vessel to a certain temperature for a certain amount of time, emptying the reactor vessel and then cleaning the reactor vessel to prepare for the next batch, running a filter to filter the output of a reactor and then running a dryer to dry the product created in the reactor vessel. Each of the series of steps associated with a different unit defines a unit procedure of the batch and the batch process will execute a different control algorithm for each one of these unit procedures. Of course, the specific materials, amounts of materials, heating temperatures and times, etc. may be different for different recipes and, consequently, these parameters may change from batch run to batch run depending on the product being manufactured or produced and the recipe being used.

One or more of the workstations 14 may also store and implement a batch display application (BDA) 32 which interfaces with one or more of the controllers 12, the data historian 19 and the batch execution engine 30 to collect batch data and to produce a display for a user on a display device, such as a computer screen, a printer, etc. illustrating the operation of one or more batch runs in a compact and easy to understand manner. While only the workstation 14a of FIG. 1 is illustrated as including a BDA 32, other ones of the workstations 14 as well as other computers connected to the LAN 15 or one of the workstations 14 thereof could store and implement a BDA 32. Likewise, the computers that implement the BDAs 32 could be connected to the process control system 10 via a hardwired connection or a wireless connection (or a combination of both) and could include devices such as laptops, hand held devices like personal data assistants, cell phones, etc. or any other portable or non-portable computer device. Those skilled in the art will understand that, while batch displays are described herein for batches using reactor units, filter units and dryer units such as those illustrated in FIG. 1, display routines may be used illustrate the operation of other desired devices to perform any other desired batch process runs.

Figure 2:
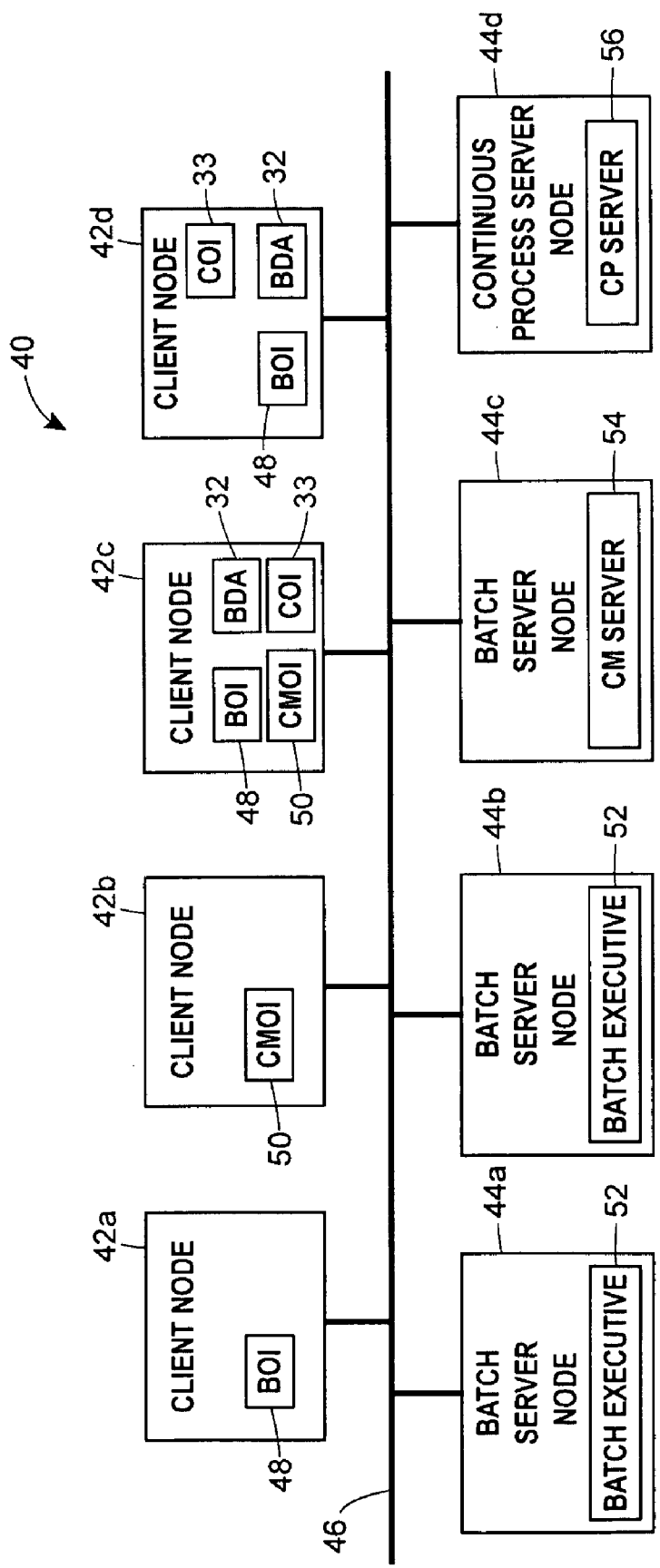
FIG. 2 is a block diagram showing a client server network in a process control system.

FIG. 2 is a block diagram of a known client/server network 40 which may be used in a process control system to implement multiple batch executive engines and if desired, multiple BDAs 32. The client server network 40 also may be used in the process control system to implement non-batch process control applications such as continuous-process operator interface applications. In particular, the network 40 includes a set of client computers or nodes 42 and a set of server computers or nodes 44 connected via a bus or other communication network 46 that may be used to enable and implement one or more batch executive routines and/or batch display applications, as well as continuous process or non-batch executive routines and continuous process or non-batch display applications within a process plant. Generally, the batch network architecture of FIG. 2 takes the form of a classic two-tier, client/server based design in which the client nodes 42 provide commands or messages to the server nodes 44 which then execute actual batches and non-batch process within a process plant (not shown in FIG. 2). The client nodes 42 generally include one or more batch and non-batch operator interface applications. The batch operator interface applications (BOI) enable a user to set up and configure multiple batch runs within a process plant using any desired strategy applicable to the plant and which enable one or more users to view batch data related to the batches run within the plant, while the continuous process or non-batch operator interface applications (COI) enable a user to set up and control non-batch processes and view operating data relating to such non-batch processes within the process plant. In the diagram of FIG. 2, three of the client nodes 42a, 42c and 42d are illustrated as including a batch operator interface (BOI) application 48, which is a routine that interfaces with an operator to enable an operator to set up and specify an individual batch to be run, i.e., to initiate one or more batch runs and monitor and interact with the batch runs that have been initiated. Similarly, the client nodes 42b and 42c are illustrated as including a campaign manager operator interface (CMOI) application 50 which enables a user to set up a campaign of batch runs (generally including multiple sequential batch runs) to be run or executed in a particular order or at particular times in the future within the process plant. One such campaign manager application is described in detail in U.S. Pat. No. 7,020,876, entitled "Campaign Management for Batch Processes," which issued on Mar. 28, 2006, the disclosure of which is hereby expressly incorporated by reference herein. It will be understood that other BOI and CMOI applications are known and may be used as well. Moreover, two of the client nodes 42c and 42d are illustrated as including batch display applications (BDAs) 32 which may provide batch views associated with one or more batch process runs set up to be run, running, or having been run in the process plant. Client nodes 42c and 42d are shown as also including continuous-process operator interface applications (COI) 33. The COI or non-batch display applications are adapted to display continuous process or non-batch data related to the operation of the process plant.

Generally, each of the server nodes 44a and 44b is a batch server having a known batch executive routine or application 52 which establishes bi-directional communication with one or more of the BOI applications 48 and/or the BDA applications 32 within the nodes 42a, 42c and 42d, and which implements and oversees one or more separate batches within the process plant at the same time. In a similar manner, the client node 44c includes a campaign manager server application 54 which establishes bi-directional communication with the CMOI applications 50 and/or the BDA applications 32 and implements the batch campaigns created using the CMOI applications 50 by interfacing or communicating with the batch executive applications 52 (using batch initiation request) within the batch server nodes 44a and 44b. The client node 44d is a continuous process server that includes a continuous process server application 56 which establishes bi-directional communication with continuous process operator interface (COI) applications 33 in the client nodes 42c and 42d for displaying continuous process or non-batch operating data and receiving user input for controlling continuous or non-batch processes performed within the process plant and implements and oversees continuous or non-batch processes in the process plant. The client/server architecture of FIG. 2 is traditionally used to isolate the client applications from the server applications to provide greater fault tolerance.

The batch executive applications 52 respond to batch initiation requests sent by the campaign manager server 54 and the BOI applications 48 to implement one or more batch runs within the process plant and sends operational batch data to the BOI applications 48 and the BDA applications 32 for display. Similarly, the CP server 56 responds to process control commands sent from the COI applications 33 to control the continuous or non-batch processes running in the process plant and sends operational continuous process data to the COI applications for display. It will be understood that the batch server and continuous process nodes 44 are communicatively connected to one or more controllers 12 which, in turn, are communicatively connected to one or more devices, units, etc. 16, within the process plant as illustrated, for example, in FIG. 1.

Figure 3:
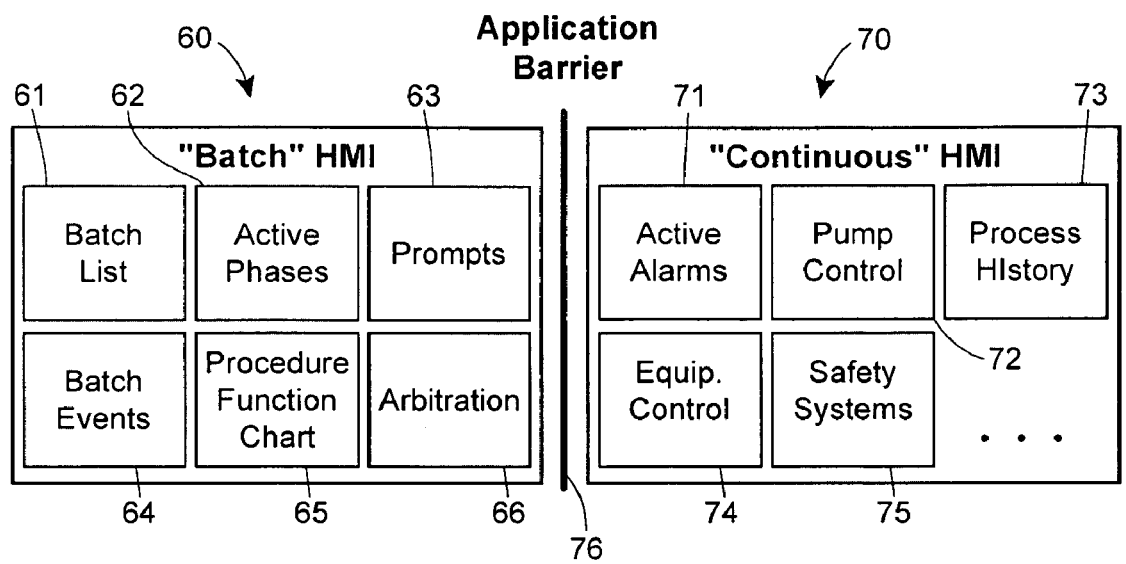
FIG. 3 is a block diagram showing separate batch and non-batch HMI applications.

Batch control HMIs such as the BDAs 32, BOIs 48 and the CMOI 50 and the continuous process (non-batch) HMIs such as the COIs 33 shown in FIG. 2 are typically separate and distinct applications. Batch HMIs and non-batch HMIs may be provided on separate workstations so that an operator or engineer can monitor batch operations and otherwise interact with batch processes from one workstation and view and interact with non-batch operations from another workstation. Alternatively, batch and non-batch HMIs may be implemented on the same workstation. Even when executed on the same workstation, however, batch and non-batch HMIs are typically distinct applications. An operator or engineer viewing non-batch process data on a non-batch HMI must exit the non-batch HMI application and open a separate batch HMI to view and interact with the batch processes. This "application barrier" is graphically depicted in FIG. 3. A batch HMI 60 is shown alongside a separate and distinct non-batch HMI 70. The batch HMI 60 includes a plurality of views or display screens that present batch operation data in various structured formats for quickly and accurately presenting batch related data to an operator, engineer, or other plant personnel and receiving input from the operator engineer or other personnel for interacting with the batch processes. The batch views shown in FIG. 3 include Batch List 61, Active Phases 62, Prompts 63, Batch Events 64, Procedure Function Chart 65, and Arbitration 66 views. The non-batch HMI 70 similarly includes a plurality of views or display screens for presenting continuous process data to and receiving user input from an operator, engineer or other process plant personnel. The various continuous process views shown in the non-batch HMI 70 include Active Alarms 71, Pump Control 72, Process History 73, Equipment Control 74, and Safety Systems 75 views. As can be seen in FIG. 3, the batch HMI 60 and the non-batch HMI 70 are separated by an "application barrier" 76. The application barrier 76 is not a physical barrier, but rather a logical separation between the batch HMI application 60 and the non-batch HMI application 70. This logical separation emphasizes the fact that the batch HMI 60 and the non-batch HMI 70 are separate and distinct applications with no functional overlap between them. The views included in the batch HMI application 60 have no interaction with the views included in the non-batch HMI application 70. The two applications do not share data or rely on data generated in the other application, nor are they influenced by actions performed with respect to the other application.

Figure 4:
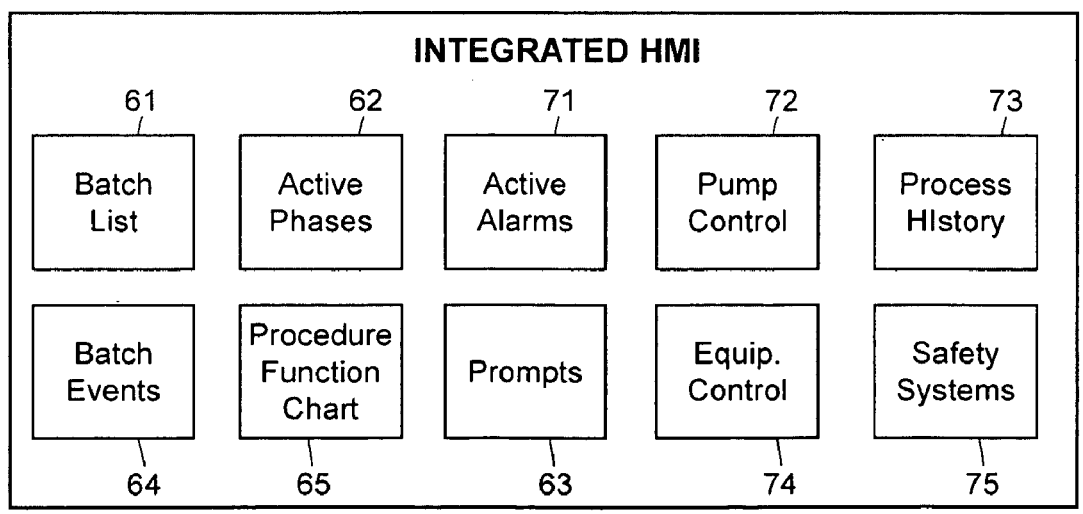
FIG. 4 is a block diagram showing in integrated HMI application including both batch and non-batch interface views.

The application barrier 76 depicted in FIG. 3 between the batch HMI 60 and the non-batch HMI 70 can be an inconvenience in the field. At various times an operator, engineer or other plant personnel may need to view both batch data and continuous process data at the same time. With the arrangement shown in FIG. 3, the user must either physically move from one workstation to switch between batch and non-batch views if the batch HMI application and the non-batch HMI are implemented on separate workstations. At minimum the operator engineer or other plant personnel must exit one application and enter the other to switch between the batch and non-batch views when both the batch and non-batch HMIs are implemented on the same workstation. In order to avoid this situation it is desirable to create a single integrated HMI that includes both batch views and non-batch views. Such an integrated HMI is illustrated in FIG. 4. An integrated HMI 90 includes batch list views such as batch list 61, phases 62, prompts 63, batch events 64, procedure function chart 65, Arbitration 66, as well as the non-batch process views such as active alarms 71, pump control 72, process history 73, equipment control 74, and safety systems 75 from the non-batch process HMI application 70 provided separately in the independent batch and non-batch HMIs shown in FIG. 3. In the integrated HMI 90, however, all of the various views, including the batch views 61-65 and the non-batch process views 71-75, are implemented on a single platform in a single application. In this implementation no application barrier divides the batch views from the continuous process views. An operator, engineer or other plant personnel is free to switch from one view to another, including from a batch view to a non-batch view, or from a non-batch view, to a batch view without exiting the single integrated HMI application 90.

Integrating process control batch views and non-batch views into a single HMI application as shown in FIG. 4, however, is no simple task. Batch process data and non-batch process data are significantly different, and gathering and displaying batch data and non-batch data requires significantly different logical processes. It is for these reasons that batch control HMIs and continuous process HMIs evolved separately in the first place. Displaying continuous process data is relatively straightforward—measuring process variables and displaying the measured process variable values in a way that provides a user with insight into the operation of the process. Batch data, however, are more stateful and event driven. A batch HMI requires a richer palette of collected data and more elaborate processing in order to present the data in a meaningful way.

Figure 5:
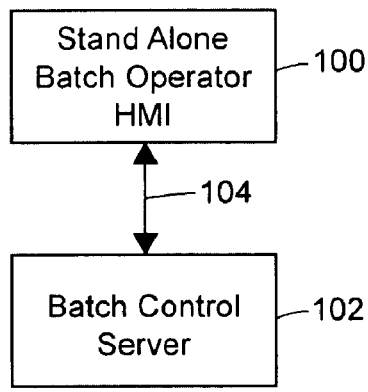
FIG. 5 is a block diagram showing a traditional stand alone batch operator HMI.

A block diagram of a typical stand-alone batch operator HMI is shown in FIG. 5. A stand-alone batch HMI application 100 has a single logical communication connection 104 with a batch control sever 102. The stand-alone batch HMI 100 supports multiple views of the batch processes being performed in the process plant. For example, the batch interface views may comprise the batch list 61, active phases 62, prompts 63, batch events 64, procedure function chart 65, and arbitration 66 views described above with regard to FIGS. 3 and 4. The data populating such views are retrieved from the batch control server 102 via the one-to-one sever connection 104 and are shared among the various views. Since the various views are generated and accessed from within the same application, the stand-alone batch HMI application is well adapted to store and display information regarding the current state of various batch processes that are active or are being queued for processing in the process plant, and to provide contextual navigation between various views.

In the stand-alone batch operator HMI 100, the various interface views that comprise the batch HMI are interrelated components of a single software application. Individual views may share data, and user interactions with one view may be easily reflected in the data that are is displayed in another view, or the manner in which the data are displayed in the other view. Thus, selecting a particular batch in a first interface view may lead to more specific data about the selected batch being displayed in a subsequent interface view. Such contextual navigation through the various interface views greatly improves the usability of the batch HMI application. Also, a stand-alone batch HMI application requires only a single logical communication connection with a batch control server to access data relating to the state of the various batch processes active within a process plant. The batch HMI application sends requests for data to the batch server, and the data received in response to such requests is shared between the various interface views. Thus, if the same data are displayed in separate interface views, the data need only be requested from the batch control server once rather than requiring repeated requests for the same data each time it is to be displayed by a different interface view.

Figure 6:
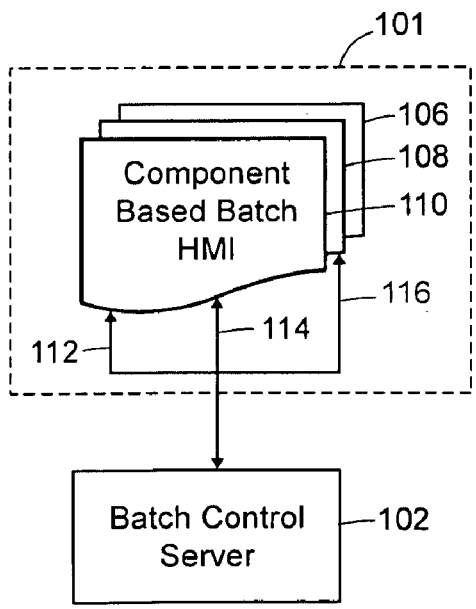
FIG. 6 is a block diagram showing a component based batch operator HMI.

FIG. 6 is a block diagram of a componentized batch HMI 101. The componentized batch HMI includes a plurality of independent software objects defining a plurality of separate batch HMI views 106, 108, 110, etc. The independent componentized batch views may be embedded in a traditional non-batch HMI to create a single integrated HMI application that provides both batch and non-batch interface views.

In this embodiment, the graphical components comprising the batch control interface views are separated from the data that populates them. When a particular stand-alone batch control interface view is executed by the non-batch HMI application, the graphical components of the batch control interface view are displayed. However, the data required to populate the graphical components must be retrieved from the batch control server. Thus, each component view 106, 108, 110, etc., includes its own logical communication connection 112, 114, 116, etc., with the batch control server 102. The stand-alone software objects defining the batch control interface views include instructions for requesting the required data for populating the various batch interface views from the batch control server 102. A problem arises, however, in that the instructions for requesting data from the batch control server will be executed each time a batch process interface view is executed, regardless of the context in which it is executed. Thus, when a new batch process interface view is launched, it will request all the data necessary for displaying the view in all contexts regardless of which data are actually required for the particular context in which the batch process view is being launched. Furthermore, the batch view must request the data regardless of whether or not the same data may have been requested by a previously executed batch interface view, or whether it had requested the same data itself the last time it was launched. Thus, breaking the batch HMI application up into separate stand-alone software objects embedded within the non-batch HMI application significantly increases the data communication demands on the system.

Further, because each componentized batch view is independent of the others, the context in which component batch views are launched is lost. A particular batch interface view will have no way of knowing which view has previously displayed, or which data were being viewed in the previous view. For example, in order to display the appropriate data in a newly launched interface view, it may be necessary to know which batch, or recipe, or area of the plant, was displayed in the previous view, or some other context data. Therefore, in the embodiment shown in FIG. 6, the context in which the individual component batch views are opened must somehow be provided so that the componentized batch views display data that is appropriate to the context. This may require additional input from the user. For example, a user who wants to view batch events associated with a particular batch may be required to specify the particular batch for which event data is desired, even though the batch had been selected in an operation associated with a previously viewed component batch view. Requiring a user to re-enter contextual information each time a different batch view is displayed can become quite burdensome on the user.

Figure 7:
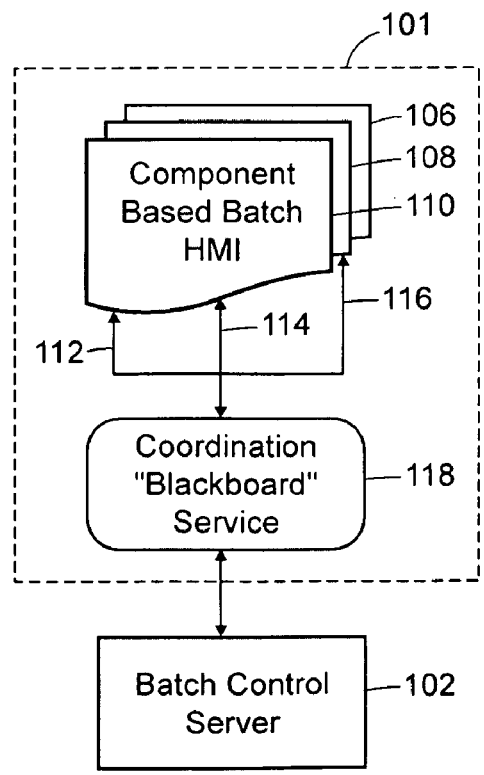
FIG. 7 is a block diagram showing a component based batch operator HMI including a "Blackboard" service.

A solution to these problems is shown FIG. 7. The solution involves inserting a "blackboard service" 118 between the componentized batch views 106, 108, 110, etc. integrated within the non-batch HMI 101 and the batch server 102. In this embodiment each of the component batch views 106, 108, 110 has its own logical communication connection with the blackboard service 118, but the blackboard service 118 requires only a single logical communication connection with the batch control server 102. The batch control server 102 writes data to the blackboard service 118, and the component batch views 106, 108, 110 are adapted to read data from and write data to the blackboard service 118. Thus, the blackboard service may gather all of the necessary data for populating the various component batch views 106, 108, 110, etc., from the batch server, store the data, and provide the data to the various batch views as necessary when the various batch views are individually launched by the integrated HMI application. This arrangement significantly reduces the communication burden on the batch server 102 application compared to the situation in FIG. 6 where each componentized batch view had its own logical communication connection directly with the batch control server 102.

Figure 8:
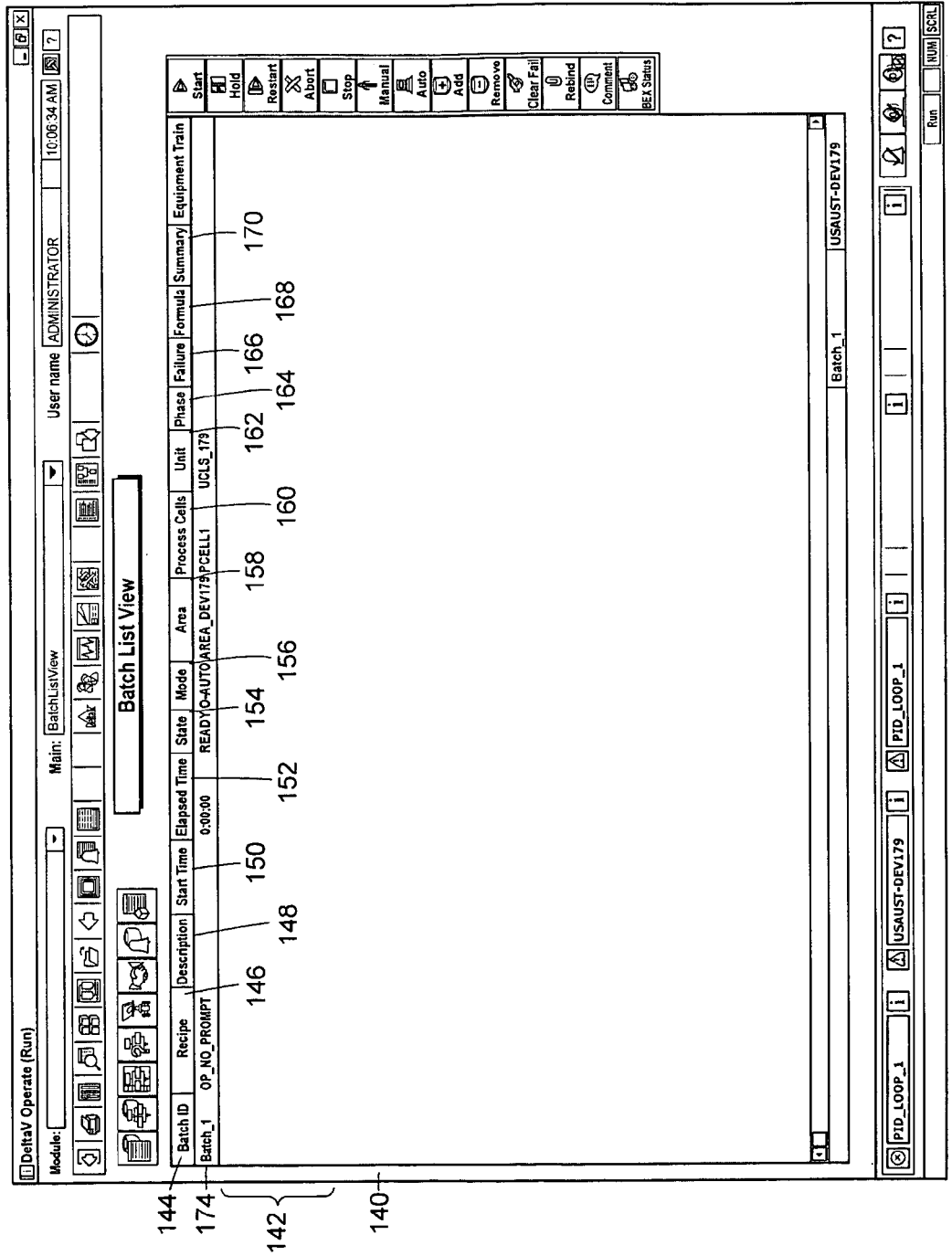
FIG. 8 is a display screen shot of a Batch List batch interface view.
Figure 9:
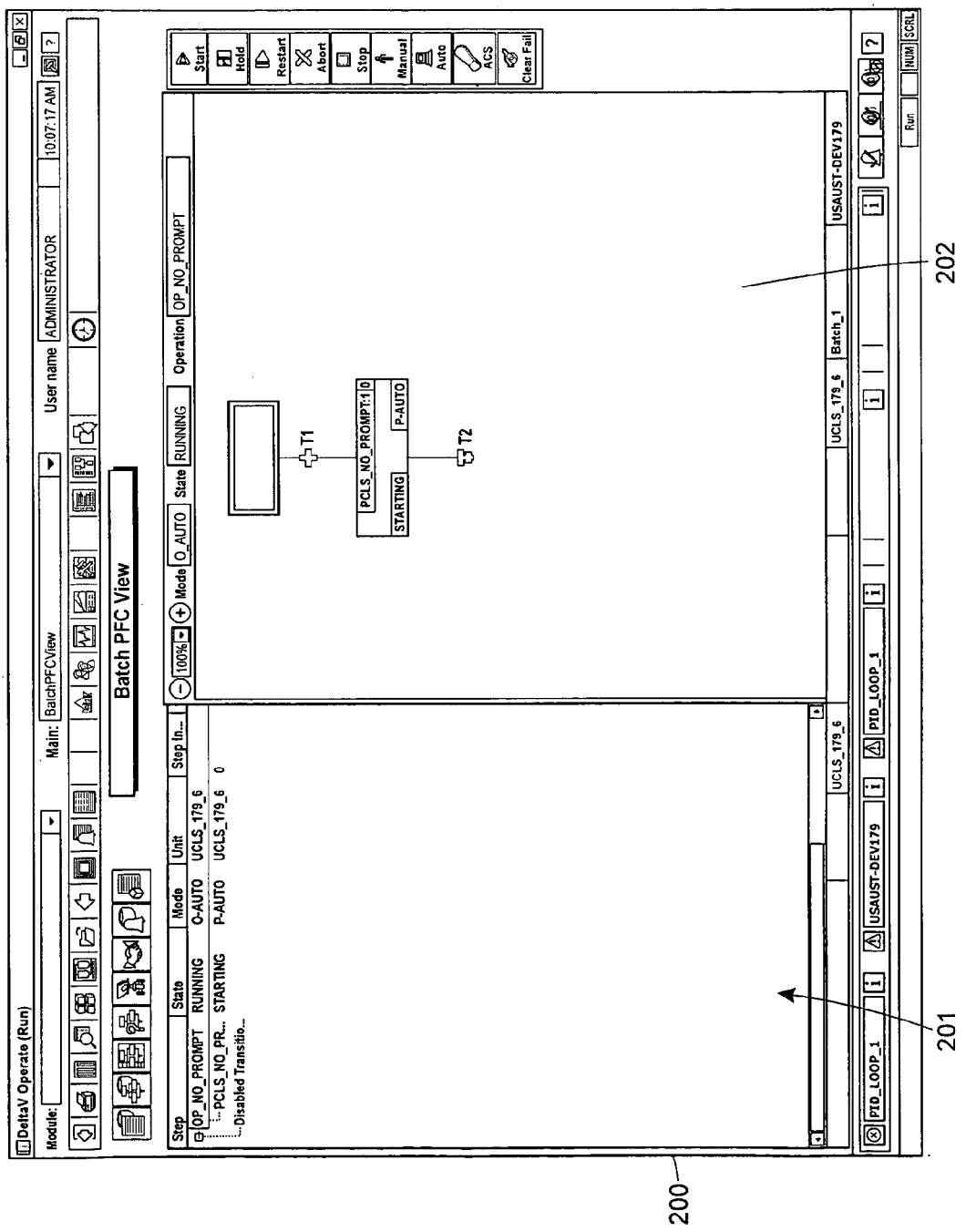
FIG. 9 is a display screen shot of a Procedure Function Chart batch interface view.
Figure 10:
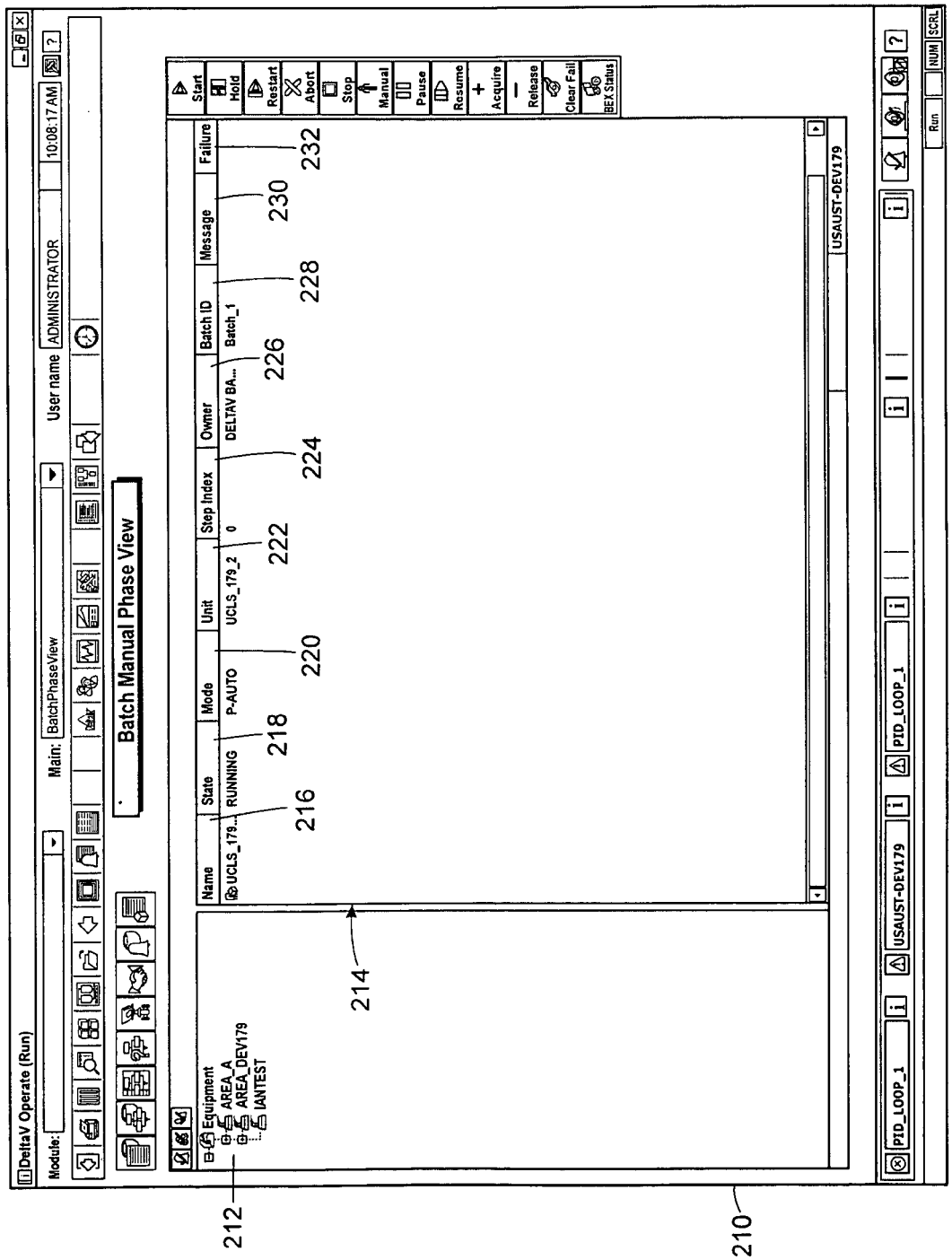
FIG. 10 is a display screen shot of a Phase batch interface view.

The component batch views 106, 108, 110, etc., of an integrated HMI interface 101 such as that shown in FIG. 7 may include the Batchlist 61, Phases 62, Prompts 63, Batch Events 64, Procedure Function Chart (PFC) 65, and the Arbitration 60 shown in the integrated HMI 90 of FIG. 4. Detailed examples of a Batchlist view 140, a PFC view 200, a Phases view 210, an Arbitration view 240, a Prompts view 260 and a Batch Events view 270 are shown in FIGS. 8-12, respectively. The Batchlist view 140 of FIG. 8 shows a list 142 of all batches that are currently active in the batch control system. Each batch is listed along with various batch properties such as the batch I.D. 144, recipe 146, description 148, start time 150, elapsed time 152, state 154, mode 156, area 158, process cells 160, unit 162, phase 164, failure 166, formula 168, summary 170, and equipment train 172. The PFC view 200 (FIG. 9) shows detailed information regarding the current state of a batch. The left-hand side 201 of the PFC view 200 shows the batch recipe as a tree hierarchy. Batch recipes may be quite complex, and in one embodiment of an integrated HMI may have a branch depth of up to four levels. The right-hand side 202 of the PFC view shows a graphical representation of the process steps included in a particular item selected from the recipe tree on the left side of the PFC view. The graphics may be color coded such that the color of the graphical representation of a particular step represents the current state of the step. An alpha-numeric string name may accompany each step. Failure information may be conveyed based on the color of the step, as well as in written information included in information panels located along the bottom of the page. Unit information may also be provided along the bottom of the panel. The phase view 210 (FIG. 10) shows an equipment hierarchy 212, and a list of phases 214 and phase properties including, but not limited to, name 216, state 218, mode 220, unit 222, step index 224, owner 226, batch I.D. 228, message 230, failure 232, area, unit, process cell, combined history I.D., and single step. (The phase properties area, unit process cell, combined history I.D., and single step are not shown in the screen shot of the phase view 210 of FIG. 10, but could be displayed by moving the scroll bar at the bottom of the page.) The arbitration view 240 (FIG. 11) shows detailed information about the ownership of anything that can be owned or own other things within the batch control system. An equipment hierarchy is shown on the left side 242 of the display. The ownership information, shown on the right side of the display, may be broken down into four categories—owns 244, owned by 246, needs 248, and needed by 250. Each category comprises a list. An item can own, be owned, need, or be needed by multiple objects. The prompt view 260 (FIG. 12) shows prompt information 262. A prompt is a method by which batches ask operators for information needed to proceed with processing various batches. The EVT view 270 (FIG. 13) shows detailed historical information generated by a batch as it is processed. The information may be archived, and clients can read the event data even after the batch is no longer running on the system. The event data may include the time 272, the batch I.D. 274, the recipe 276, a description 278, an event type 280, value 282, engineering units 284, area 286, process cell 288, and unit 290.

Returning to FIG. 7, an advantage of inserting the blackboard service between the various component batch views and the batch control server is that the various batch views can write contextual data to the blackboard service so that when a subsequently launched component batch view is opened, the later view can read the contextual data written by the previous view and populate the new view with data appropriate to the context in which the new view is launched. Many times a user will wish to take an action on an item based on data presented in a first batch view. The action that the user wishes to take may be implemented in a batch view other than the particular view that the user is viewing when making the determination to take action on the particular item. The user may wish to open the second view to view additional data and access additional interface options for taking actions relating to the item displayed in the first view. The blackboard service allows the second or subsequent batch view to be opened, displaying data and interface options related to a particular item selected from the first or precursor interface view. For example, consider the situation where a user is viewing the PFC view 200 shown in FIG. 9. Suppose the user wants to view the arbitration ordering of a process unit that will soon be required by a batch process step that the user is viewing in the PFC view. When the user exits the PFC view in favor of the arbitration view, the PFC view writes the name of the unit that the user was viewing on the PFC view to the blackboard service. The blackboard service stores the name of the unit in an area where the arbitration view is configured to look for the data. As the Arbitration view opens, it reads the unit name from the designated location of the blackboard service. The Arbitration view then knows to populate the displayed Arbitration view with arbitration data associated with the specified unit. In another example, the batch list view could write the identity of a currently selected batch to the blackboard when another view, such as the PFC view, is launched. In this case, the newly launched view may be populated with details relating to the selected batch. In systems having multiple display monitors, the second view can be displayed immediately on a different display monitor even as the first view, in this case the batch list view, remains on display on the first display monitor.

In order to facilitate the contextual launching of subsequent embedded batch views described above, each precursor view may be configured to determine all of the subsequent views that may be opened in context based on the displayed state of the precursor view. The precursor view may be further configured to identify the specific context data required by each of the identified subsequent views, and to write the context data to designated locations in the blackboard service corresponding to each of the identified subsequent views. Likewise, the various embedded batch views may be configured to read the data stored in the specified locations of the blackboard service when they are launched. For example, the computer code defining a first embedded batch view may include a table that identifies all other embedded batch views in the integrated HMI that can be opened subsequent to the opening of the first batch view and for which content displayed in the subsequent view depends on the context or state of the first batch view when the subsequent view is opened. The table may further specify which contextual data from the first embedded batch view is needed for each subsequent view. Thus, when the first embedded batch view is closed (because a different view is being opened), it may be configured to write the specified contextual data to the blackboard service in locations corresponding to the embedded batch views identified in the table. Similarly, the computer code defining each embedded batch view may include the address of, pointer pointing to, or some other indication of the various locations in the blackboard service where contextual data may be stored and which the embedded batch view must read in order to obtain the contextual data needed to open the embedded batch view populated with data appropriate for the context in which it is being launched.

The tables below are provided to show the various contextual data that may be shared between the embedded batch views show in FIGS. 8-13. The first column in each table shows the various contextual data elements included in a particular embedded batch view. The second column identifies the corresponding embedded batch views which may require or benefit from the contextual data element in the first column.

| BATCHLIST VIEW | |
|---|---|
| Batch View Data Element | Batch Views Launchable in Shared Context Relying on Corresponding Batch View Element |
| Batch ID | PFC, EVT, Prompt, Phase, Arbitration |
| State | PFC (exclusion/sorting) |
| Area | Prompt, Phase, Arbitration, EVT |
| Process Cell | Prompt, Phase, Arbitration, EVT |
| Unit | Prompt, Phase, Arbitration, EVT |

-continued

BATCHLIST VIEW

| Batch View Data Element | Batch Views Launchable in Shared Context Relying on Corresponding Batch View Element |
|---|---|
| Phase | Prompt, Phase, Arbitration, EVT |
| Failure | Phase |
| Recipe | Prompt |
| Combined History ID | Phase, PFC, EVT, Prompt, Arbitration |

PFC VIEW

| PFC View Data Element | Batch Views Launchable in Shared Context Relying on Corresponding PFC View Element |
|---|---|
| Unit | Batchlist, Prompt, Phase, Arbitration, EVT |
| Failure | Batchlist, Phase |
| Phase | Batchlist, Prompt, Phase, Arbitration, EVT |
| Batch ID | Batchlist, Prompt, Phase, Arbitration, EVT |

EVT VIEW

| EVT View Data Element | Batch Views Launchable in Shared Context Relying on Corresponding EVT View Element |
|---|---|
| Batch ID | Batchlist, PFC, Prompt, Phase, Arbitration |
| Area | Batchlist, Prompt, Phase, Arbitration |
| Process Cell | Batchlist, Prompt, Phase, Arbitration |
| Unit | Batchlist, Prompt, Phase, Arbitration |
| Phase | Batchlist, Prompt, Phase, Arbitration |

PROMPT VIEW

| Prompt View Data Element | Batch Views Launchable in Shared Context Relying on Corresponding Prompt View Element |
|---|---|
| Batch ID | Batchlist, PFC, EVT, Phase, Arbitration |
| Recipe | Batchlist |
| Area | Batchlist, EVT, Phase, Arbitration |
| Process Cell | Batchlist, EVT, Phase, Arbitration |
| Unit | Batchlist, EVT, Phase, Arbitration |
| Phase | Batchlist, EVT, Phase, Arbitration |

PHASE VIEW

| Phase View Data Element | Batch Views Launchable in Shared Context Relying on Corresponding Phase View Element |
|---|---|
| Phase | Batchlist, Prompt, EVT, Arbitration |
| Owner | Arbitration |
| Area | Batchlist, EVT, Prompt, Arbitration |
| Unit | Batchlist, EVT, Prompt, Arbitration |
| Process Cells | Batchlist, EVT, Prompt, Arbitration |
| Batch ID | Batchlist, PFC, EVT, Prompt, Arbitration |
| Combined History ID | EVT, Batchlist, PFC, Prompt, Arbitration |
| Failure | Batchlist |

ARBITRATION VIEW

| Arbitration View Data Element | Batch Views Launchable in Shared Context Relying on Corresponding Arbitration View Element |
|---|---|
| Batch ID | Batchlist, PFC, EVT, Phase, Prompt |
| Area | Batchlist, EVT, Prompt, Phase |
| Unit | Batchlist, EVT, Prompt, Phase |
| Process Cell | Batchlist, EVT, Prompt, Phase |
| Phase | Batchlist, EVT, Prompt, Phase |
| Owner | Phase |

In an alternative embodiment, the stand-alone software objects defining the various batch process interface views embedded within the non-batch HMI application may include a set of configurable rules for defining the context data that is to be written to the blackboard service, when the data are to be written, and the locations within the blackboard service they are to be written to. Similarly, the configurable rules may define when the various batch interface views are to read data from the blackboard service, and the various locations from which the data are to be read. Such configurable rules provide great flexibility for those creating and implementing integrated HMIs in real-world process plant applications. Those tasked with implementing the HMI can specify with a very high level of detail which data are exchanged between batch interface views, as well as when and how the data are exchanged. In fact, for maximum flexibility, the stand-alone software objects, or a separate application for configuring the stand-alone software objects defining the various batch process views may provide open scripting by which an engineer or other personnel implementing an HMI may customize or extend the configurable rules for exchanging data between batch interface views. Access to such configurable rules for exchanging data, as well as such open scripting for customizing or extending the configurable rules for exchanging data, may be restricted based on operator privileges, or on a recipe-by-recipe-basis, or based on some other security criteria.

Figure 11:
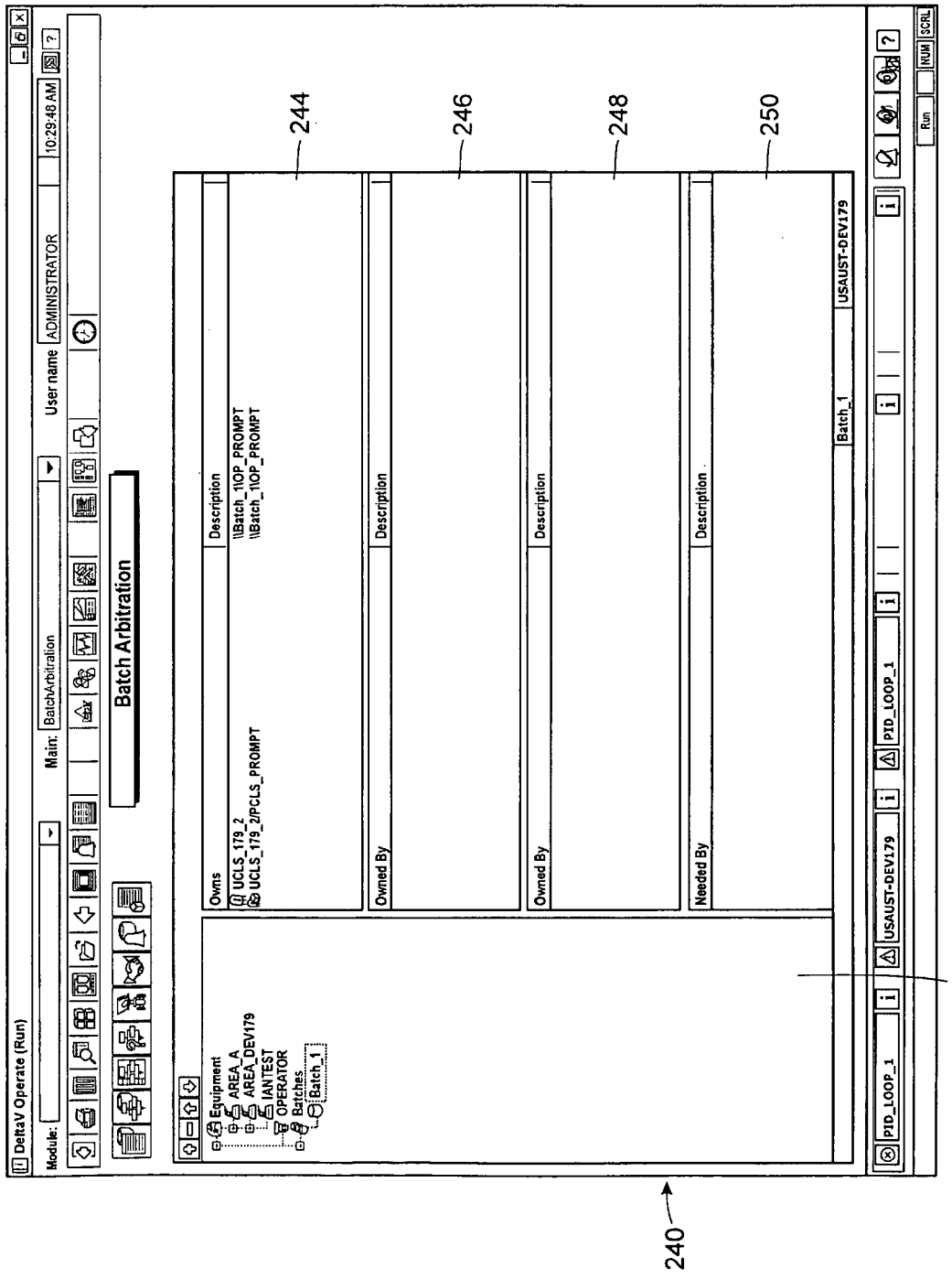
FIG. 11 is a display screen shot of an Arbitration batch interface view.
Figure 12:
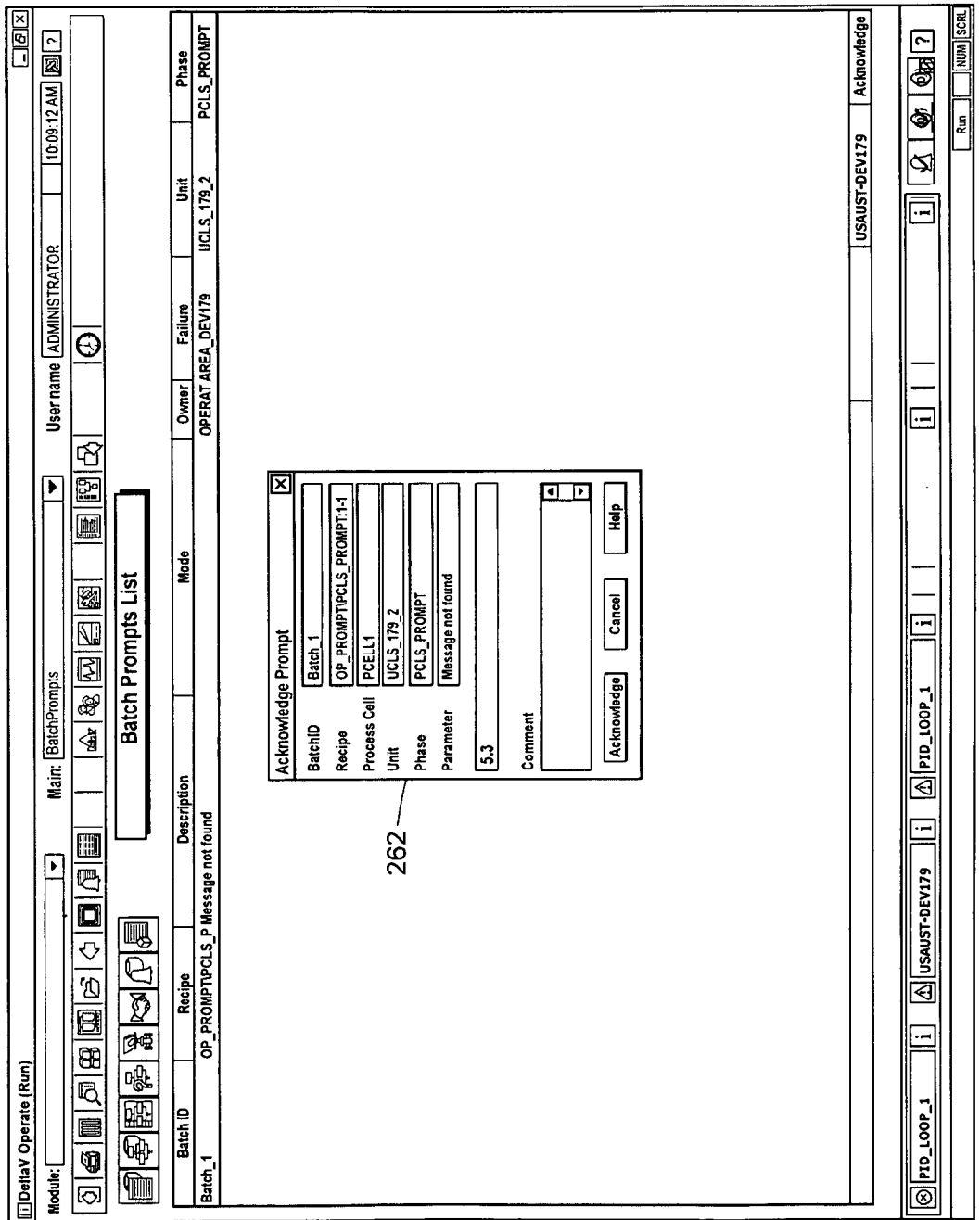
FIG. 12 is a display screen shot of a Prompt batch interface view.

Another advantage of the blackboard service 118 is that it can provide data persistence in cases when an operator is navigating between views, but often returning to the same view over and over again. The user may want the view that he or she is returning to time and again to open in the same state each time it is opened with the same data displayed. The blackboard service can ensure that the view that is returned to over and over again is always displayed in the same state and with the same data. A first interface view may write data to the blackboard service when the user exits the first view to open another subsequent view. After viewing the subsequent view, the operator may wish to return to the first view. When the first view is executed the second time, the data stored to the blackboard service may be quickly retrieved, allowing the first view to be created in the same state and with the same data as when it last was exited. Again, for example, suppose a user is viewing the PFC view 200 shown in FIG. 9. The user sees that a particular piece of equipment will soon be required by a particular batch process the user happens to be monitoring. The user may wish to check the ownership of the equipment that will be needed by the monitored batch in order to resolve any potential conflicts. The user exits the PFC view 200 in favor of the Arbitration view 240 (FIG. 11). Before the PFC view 200 is closed, however, it stores to the blackboard service all of the state data and batch data necessary to recreate the PFC view exactly as it was before the user chose to exit the PFC view 200 and access the Arbitration view 240. After viewing the Arbitration view 240 and taking whatever actions are necessary to ensure the proper operation of the batch, the user returns to the PFC view 200. Upon the relaunching of the PFC view 200, the PFC view need only read the state data and batch data stored on the blackboard service to recreate the PFC view at exactly the same step and level in the recipe tree that the user was viewing before launching the Arbitration view. This is a significant improvement over the integrated HMI shown in FIG. 6 in which, when the PFC view is launched the second time, the PFC view would have to request all of the data for populating the PFC view from the batch control server, and the user would be required to step through the recipe tree in order to display the particular step that was displayed before the Arbitration view 240 was opened.

The data persistence described above with regard to the PFC view may be made available to all of the other embedded batch HMI components as well. What is more, the state and batch data written to the blackboard service when a particular componentized batch view is exited may be accessed by other indirectly related components. For example, an Alarm view may write the units and phases being viewed by the user to the blackboard service. A separate component could be created to read these data and keep a history of the units that have had alarms. Such a component could determine whether a certain unit has had an excessive number of problems, indicating a trouble spot that could benefit from process improvements to reduce the number of alarms.

Another advantage of the blackboard service 118 is that it may be used to create an indirect communication channel between various embedded batch views for which there are no direct links. For example, some HMI implementations may have multiple monitors, each capable of loading views independently. In this case, the batch list view displayed on one monitor could write the currently selected batch to the blackboard. The PFC view could be launched immediately on another monitor showing all of the PFC detail for the selected batch.

While the present disclosure has been described with reference to specific examples, which are intended to be illustrative only and not to be limiting, it will be apparent to those of ordinary skill in the art that changes, additions or deletions may be made to the disclosed embodiments without departing from the spirit and scope of the invention.

The invention claimed is:

1. An integrated process control interface for displaying batch control and non-batch control process data and receiving user input for controlling batch and non-batch processes within a process control plant, the integrated process control interface comprising:
    a display device;
    an input device for receiving user input;
    a processor adapted to execute program instructions;
    a computer memory;
    program instructions comprising a continuous process control interface application stored in the computer memory which, when executed by the processor, cause a plurality of continuous process control interface views to be displayed on the display device and allow user input to be received from the input device for controlling operation of continuous processes in the process plant, the program instructions further including a plurality of self-contained software objects embedded therein, when executed by the processor the self-contained software objects causing a different batch process interface views to be displayed on the display device and allowing user input to be received from the input device for controlling batch processes within the process plant; and
    program instructions comprising a blackboard service stored in the computer memory which when executed by the processor allow data written from the self-contained software objects to be stored in the computer memory and allow data stored in the computer memory to be written to the self-contained software objects;
    wherein a first self-contained software object of said plurality of self-contained software objects, when executed by the processor, is configured to cause a first batch process control interface view to be displayed on the display device and to write contextual data to the blackboard service when execution of the first self-contained software object is terminated, the contextual data written to the blackboard service relating to a displayed state of the first batch process control interface view when execution of the first self contained software object was terminated; and
    wherein a second self-contained software object of said plurality of self-contained software objects, when executed by the processor, is configured to read the contextual data written to the blackboard service by the first self-contained software object such that the second self-contained software object displays a second batch process control interface view in a displayed state based at least in part on the displayed state of the first batch process control interface view when execution of the first self-contained software object was terminated.

2. The integrated process control interface of claim 1 wherein the program instructions comprising the blackboard service are further adapted to cause the processor to communicate with a batch control server to receive and store batch process control data to be displayed in the batch process interface views displayed when the self-contained software objects are executed.

3. The integrated process control interface of claim 1 wherein the program instructions comprising the blackboard service are further adapted to cause the processor to communicate with a batch control server to forward user input commands received in association with a displayed batch process interface view for controlling a batch process within the process plant.

4. The integrated process control interface of claim 1 wherein the plurality of embedded self-contained software objects, when executed by the processor, are adapted to cause batch interface views to be displayed including at least one of a Batchlist view; a Procedure Function Chart view; a Phase view; a Prompt view; an Arbitration view; or a Batch Events view.

5. The integrated process control interface of claim 1 wherein the first self-contained software object identifies one or more other self-contained software objects which require contextual data indicative of the state of the batch process interface view displayed on the display device based on execution of the first self-contained software object, and writes context information required by the one or more other self-contained software objects to the blackboard service.

6. The integrated process control interface of claim 1, wherein the first self-contained software object is configured contextual data written to the blackboard service when execution of the first self-contained software object was terminated a next time the first self-contained object is executed, so that the batch process interface view associated with the first self-contained software object may be displayed on the display device in the same state that the batch process interface view associated with the first self-contained software object was in when execution of the first self-contained software object was terminated the first time.

7. An integrated process control interface system for displaying both batch process control data and non-batch process control data and receiving user input for controlling both batch and non-batch processes within a process plant, the integrated process control interface system comprising:
   a batch process data server;
   a non-batch process data server;
   one or more workstations communicatively coupled to the batch process control data server and the non-batch process control data server, whereby the batch process control data server and the non-batch process control data server provide batch and non-batch process data to the one or more workstations, and the one or more workstations provide batch and non-batch process control data for controlling the batch and non-batch processes operating within the process plant to the batch process control server and the non-batch process control server;
   at least one of the one or more workstations implementing a non-batch process control interface application for displaying a plurality of non-batch process control interface views for presenting non-batch process control data to a user and receiving user input for controlling non-batch processes within the process plant;
   the non-batch process control interface application including a plurality of embedded self-contained software objects which, when executed, generate batch process control interface views for presenting batch process control data to a user and for receiving user input for controlling batch processes within the process plant; and
   at least one of the one or more workstations implementing a blackboard service accessible by the embedded software objects whereby the embedded software objects may write data to and read data from the blackboard service;
   wherein a first self-contained software object of said plurality of self-contained software objects, when executed by a workstation implementing the continuous process control interface application, is configured to cause a first batch process control interface view to be displayed and to cause contextual data relating to a displayed state of the first bath process view to be written to the blackboard service; and
   wherein a second self-contained software object of said plurality of self contained software objects, when executed by the workstation implementing the continuous process control interface application, is configured to read the contextual data written to the blackboard service by the first self-contained software object such that the second self-contained software object causes a second batch process control interface view to be displayed in a displayed state based at least in part on the displayed state of the first batch process control interface view.

8. The integrated process control interface system of claim 7 wherein the batch process interface views generated by the self-contained software objects embedded within non-batch process control interface application comprise at least one of a Batchlist view; a Procedure Function Chart view; a Phase view; a Prompt view; an Arbitration view; or a Batch Event view.

9. The integrated process control interface system of claim 7 wherein a first embedded software object writes context data to the blackboard service indicative of one or more user input actions taken with respect to a first batch process interface view generated by the first embedded software object before a second embedded software object is executed, and when the second embedded software object is executed, the second software object reads the context data from the blackboard service and generates a second batch process interface view based on the context data, where the second batch process interface view is consistent with the one or more user input actions taken with respect to the first batch process interface view.

10. The integrated process control interface system of claim 7 wherein when a first embedded software object is executed, the first embedded software object identifies one or more other embedded software objects which, when executed, generate batch process interface views which are determined based on contextual data associated with the batch process interface view generated by the first embedded software object, and wherein the first embedded software object writes the contextual data required by the other embedded software objects to the blackboard service.

11. The integrated process control interface system of claim 10 wherein when one of the other embedded software objects is executed, the one of the other software objects identifies one or more embedded software objects which may have been contextual precursors to the one of the other embedded software objects by having been executed prior to execution of the one of the other embedded software objects and having a previously displayed display state which determines at least a portion of the batch process interface view generated by the one of the other embedded software objects, and wherein one of the other embedded software objects reads contextual data from the blackboard service written by the embedded software objects identified as contextual precursors to the execution of the one of the other embedded software objects.

12. The integrated process control interface system of claim 7 wherein a first embedded software object is configured to write contextual data to the blackboard service indicative of a display state of a batch process interface view generated by the first embedded software object prior to execution of a second embedded software object, and is configured to read the contextual data from the blackboard service when the first embedded software object is executed a second time, so that the batch process interface view generated by the first embedded software object is displayed the second time in the same display state that was displayed prior to execution of the second embedded software object.

13. A method of displaying batch process control interface views via a continuous process control interface application, the method comprising:
   providing a continuous process control interface application adapted to display a plurality of continuous process control interface views on a display device;
   embedding a plurality of self-contained software objects within the non batch continuous process control interface application, the self-contained software objects adapted to generate individual batch process control interface views for display on an interface display device;
   executing a first self-contained software object to display a first batch process control interface view a first time;
   closing the first self-contained software object;
   the first self-contained software object writing contextual data to a blackboard service, the contextual data representing a display state of the first batch process control interface view when the first self-contained software object is closed;
   executing a second self-contained software object embedded in the continuous process control interface application;

the second self-contained software object reading the contextual data written to the blackboard service; and displaying a second batch process control interface view generated by the second self-contained software object in a state reflecting the displayed state of the first process control interface view when the first self-contained software object was closed.

14. The method of claim 13 wherein the batch process interface view generated by the second self-contained software objects comprises a Batch List view; a Procedure Function Chart view; a Phase view; a Prompt view; an Arbitration view; or a batch event view.

15. The method of claim 13 further comprising:
executing the first self-contained software object a second time;
reading the contextual data written to the blackboard service when the first self contained software object was closed; and
displaying the first batch process control interface view in the same display state as when the first self-contained software object was executed and closed the first time.

16. The method of claim 13 wherein the contextual data written to the blackboard service comprises data identifying a batch that is active in the process plant such that the second batch process interface view displays further information relating to the identified batch.

17. The method of claim 13 wherein the contextual data written to the blackboard service comprises data identifying equipment within the process plant such that the second batch process interface view displays further information relating to the identified equipment.

18. The method of claim 13 wherein the contextual data written to the blackboard service comprises data identifying an area within the process plant such that the second batch process interface view displays further information relating to the identified area of the plant.

19. The methods of claim 13 wherein the context data written to the blackboard service comprises data identifying a process unit within the processing plant, such that the second batch process interface view displays further information relating to the identified process unit.

20. A computer readable medium on which programming instructions are stored which, when executed by a computer, will cause the computer to perform the steps of:
executing a non-batch process control interface application adapted to display a plurality of continuous process interface views on a display device and having a plurality of self-contained software objects embedded therein, the self-contained software objects adapted to display different batch process control interface views on the display device;
providing a blackboard service from which and to which the self-contained software objects embedded in the non-batch process control interface application may read and write contextual data relating to interface actions taken with respect to the batch process control interface views displayed on the display device when the various self-contained software objects are executed;
executing a first self-contained software objet to display a first batch process control interface view and write contextual data to a blackboard service indicative of a displayed state of the first batch process interface view; and
executing a second self-contained software object to display a second batch process control interface view wherein the second self-contained software object reads the contextual data written to the blackboard service by the first self-contained software object to display the second batch process control interface view in a state determined based at least in part on the displayed state of the first batch process control interface view.

21. The computer readable medium of claim 20, wherein the plurality of self-contained batch process control interface views embedded in the non-batch process control interface application comprises at least one of a Batchlist view; a Procedure Function Chart view; a Batch Event view; a Phase view; a Prompt view; or an Arbitration view.

* * * * *

UNITED STATES PATENT AND TRADEMARK OFFICE
CERTIFICATE OF CORRECTION

PATENT NO.       : 8,165,700 B2                          Page 1 of 1
APPLICATION NO.  : 12/244134
DATED            : April 24, 2012
INVENTOR(S)      : Nathan W. Pettus et al.

It is certified that error appears in the above-identified patent and that said Letters Patent is hereby corrected as shown below:

In the Specification:

Column 2, line 20, "are" should be -- is --.

In the Claims:

Column 20, Claim 13, line 52, "within the non batch continuous" should be -- within the continuous --.

Column 22, Claim 20, line 20, "objet" should be -- object --.

Signed and Sealed this
Fourteenth Day of January, 2014

Michelle K. Lee
*Deputy Director of the United States Patent and Trademark Office*